United States Patent
Arham et al.

(10) Patent No.: US 12,289,233 B1
(45) Date of Patent: *Apr. 29, 2025

(54) VIRTUALIZED CELL SITE ROUTERS WITH LAYER 2 FORWARDING

(71) Applicant: Juniper Networks, Inc., Sunnyvale, CA (US)

(72) Inventors: Muhammad Qasim Arham, Frisco, TX (US); Vinod Nair, San Jose, CA (US); Vinay K Nallamothu, Sunnyvale, CA (US); Kiran K N, Bangalore (IN); Shelesh Bansal, Bangalore (IN); Shailender Sharma, Bangalore (IN); Rakesh Kumar Reddy Varimalla, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,150

(22) Filed: Feb. 5, 2024

Related U.S. Application Data

(63) Continuation of application No. 17/937,288, filed on Sep. 30, 2022, now Pat. No. 11,895,020.

(51) Int. Cl.
*H04L 45/42* (2022.01)
*H04L 45/00* (2022.01)
*H04L 45/28* (2022.01)

(52) U.S. Cl.
CPC .............. *H04L 45/42* (2013.01); *H04L 45/28* (2013.01); *H04L 45/566* (2013.01)

(58) Field of Classification Search
None
See application file for complete search history.

(56) References Cited

U.S. PATENT DOCUMENTS

| 9,571,394 B1 | 2/2017 | Sivaramakrishnan et al. |
| 11,074,091 B1 | 7/2021 | Nayakbomman |

(Continued)

FOREIGN PATENT DOCUMENTS

WO 2013184846 A1 12/2013

OTHER PUBLICATIONS

Kanwal et al., "Advantages of Co-Deployment of C-RAN and MEC in 5G", Jan. 12, 2021, IEEE, 2021 International Bhurban Conference on Applied Sciences and Technologies (IBCAST) (2021, pp. 932-937) (Year: 2021).*

(Continued)

*Primary Examiner* — Davoud A Zand
(74) *Attorney, Agent, or Firm* — Shumaker & Sieffert, P.A.

(57) ABSTRACT

In general, techniques are described for deploying virtualized cell site routers (vCSRs). In an example, a method comprises receiving, at a forwarding plane of a virtualized cell site router (vCSR) of a first Distributed Unit (DU) of a plurality of DU servers of a cell site for a 5G radio access network, the vCSR having a containerized routing protocol process and a forwarding plane configured to perform Layer 2 (L2) switching, L2 packets on a second interface for a second physical link connecting the first DU server to an L2 switch; and switching, by the forwarding plane of the vCSR of the first DU, the L2 packets on a first interface for a first physical link connecting the first DU server to a second DU server of the plurality of DU servers.

20 Claims, 7 Drawing Sheets

(56) References Cited

U.S. PATENT DOCUMENTS

| | | | |
|---|---|---|---|
| 11,159,366 | B1 | 10/2021 | Gawade |
| 2017/0289047 | A1 | 10/2017 | Szilagyi |
| 2017/0331765 | A1* | 11/2017 | Sharma ............... H04L 41/0213 |
| 2020/0067830 | A1* | 2/2020 | Malhotra ............ H04L 67/1097 |
| 2021/0360401 | A1 | 11/2021 | Marinho |
| 2022/0279420 | A1 | 9/2022 | Akkipeddi et al. |
| 2022/0279421 | A1* | 9/2022 | Sivakumar .......... H04W 40/248 |
| 2022/0286940 | A1* | 9/2022 | Grewal ............... H04W 40/248 |
| 2022/0329486 | A1 | 10/2022 | Nagaprakash et al. |

OTHER PUBLICATIONS

Botez et al., "SON-Based Network Slicing Mechanism for a Scalable 4G/5G Core Network: A Kubernetes Approach", May 29, 2021, IEEE, Abstract, Intra, 3.1-3.2.2 (Year: 2021).

Juniper, "Juniper Cloud native Router Deployment Guide", Juniper Networks: Engineering Simplicity, Juniper Networks, Inc., Aug. 22, 2022, 47 pp., https://www.juniper.net/documentation/us/en/software/cloud-native-router22.2/cloud-native-router-deployment/cloud-native-router-deployment-guide/cloud-native-router-deployment-guide.pdf.

KN et al., "Day One: Contrail DPDK vRouter", Juniper Networks, Inc., 2021, 196 pp., Retrieved from the Internet on Dec. 28, 2022 from URL: https://www.juniper.net/documentation/en_US/day-one-books/contrail-DPDK.pdf.

Mali et al., "Day One: Cloud Native Routing With cRPD", 2021, 93 pp., Retrieved from the Internet on Dec. 28, 2022 from URL: https://www.juniper.net/documentation/en_US/day-one-books/DO_cRPD.pdf.

Notice of Allowance from U.S. Appl. No. 17/937,288 dated Sep. 18, 2023, 11 pp.

Planet Networking & Communication, "IFB-244 Series—2-channel Optical Fiber Bypass Switch", Planet Technology Corporation, 2023, 5 pp., Retrieved from the Internet on Jan. 5, 2023 from URL: https://www.planet.com.tw/en/product/ifb-244-series.

Rosen et al., "BGP/MPLS IP Virtual Private Networks (VPNs)", Network Working Group of Internet Engineering Task Force, RFC 4364, Feb. 1, 2006, 47 pp., URL: https://www.rfc-editor.org/rfc/rfc4364.html.

Sajassi et al., "BGP MPLS-Based Ethernet VPN", Internet Engineering Task Force (IETF), RFC 7432, Feb. 1, 2015, 55 pp., URL: https://www.rfc-editor.org/rfc/rfc7432.

U.S. Appl. No. 17/843,880, filed Jun. 17, 2022, naming inventors Cirkovic et al.

* cited by examiner

VIRTUALIZED CELL SITE ROUTERS WITH LAYER 2 FORWARDING

This application is a continuation of U.S. patent application Ser. No. 17/937,288, filed 30 Sep. 2022, the entire contents of which is incorporated herein by reference.

TECHNICAL FIELD

The disclosure relates to a cloud native router and, more specifically, to supporting cell sites using a virtual cell site router with layer 2 forwarding capabilities.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. Modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container—centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for deploying virtualized cell site routers (vCSRs) capable of layer 2 (L2) forwarding to cell site servers to support management and orchestration of functional units for mobile networks executing on the cell site servers. 5G Radio Access Network (RAN) Distributed Units (DUs) can be cloud native data plane development kit (DPDK) applications, with one or more DUs executing on a server. As used herein, a server that executes a DU is referred to as a "DU server." Multiple DU servers may be co-located at each cell site to scale support of mobile traffic in the RAN, with a primary active DU server relaying traffic from cascade interfaces with one or more supporting DU servers to the group center (GC)/edge data center (EDC) that hosts a centralized unit (CU). This primary active DU server is effectively a transit switch in this example deployment. All DUs should be in the same subnet, and IP addresses should be assigned to DUs and Radio Units (RUs) via a Dynamic Host Configuration Protocol (DHCP) server accessible via a provider edge (PE) router colocated with the CU in the GC/EDC. A standby DU server for the active DU has similar connectivity to the supporting DU servers, and mobile data and control traffic can failover to the standby DU server upon failure of the active DU server.

Instead of connecting the DUs to a physical network switch at the cell site or provisioning Ethernet Virtual Private Network (EVPN)-based L2 forwarding among the DUs/RUs and the CUS, as in some existing deployments, the techniques include deploying an instance of a virtualized cell site router (vCSR) that supports L2 forwarding in the DPDK forwarding plane on each DU server. The respective vCSRs for the active and standby DU servers are provisioned with fabric interfaces (typically virtual functions-a lightweight PCIe function on a network interface card that supports single root I/O virtualization) for connectivity with the cascaded DU servers, and fabric interfaces for connectivity with the GC/EDC, in some cases via a Top-of-Rack (ToR) switch coupling multiple cell sites to the PE router in the GC/EDC. vCSRs for the DU servers in the cell site (active, standby, and supporting) may be provisioned with separate bridge domains (BDs) for one or more O-RAN interfaces, such as F1-U (ser plane) and F1-C(ontrol plane), as well as for supporting interfaces to the gNodeB functional units such as RU/DU-mgmt and Operations, Administration, and Management (OAM). The bridge domains eschew any overlay networks and can extend from the DHCP server (RU/DU-mgmt) and O-CU (F1-U/F1-C) in the GC/EDC to the RU (in the case of the F1-U BD) and the O-DUs (all BDs). "O-DU" and "DU" are used interchangeably in this description and figures, as are "O-CU" and "CU" and "O-RU" and "RU."

The techniques may provide one or more technical improvements that realize one or more practical applications. For example, with an L2 network implemented in this way, even though no physical L2 switch is present at the cell site to switch among the DU servers, all interfaces for a given BD can, in some examples, be in the same subnet and compatible with the customer's network/subnet configuration in the EDC, and IP addresses can be assigned to all DU and RU workloads from a central DHCP in the GC/EDC using a PE router with DHCP relay. The solution simplifies configuration at the cell sites over layer 3 (L3) VPN solutions requiring individuated generation and configuration of potentially multiple different subnets per cell site, which is particularly important in view of the thousands cell sites in the typical 5G network. The solution can also avoid the need to deploy a physical L2 switch at each cell site, which have limited power and space constraints. The use of vCSRs within the DU servers can also facilitate centralized orchestration and control of cloud native components, including the vCSRs and the DUs to the DU servers, and configuration and advertising of network interfaces for such components using the vCSR capabilities, in particular those of the containerized routing protocol daemon (CRPD). Finally, the use of vCSRs can facilitate migration to an L3 solution should a different physical deployment of DU servers and cell sites be engaged by the customer.

In some cases, the virtualized devices including the virtual cloud native router (vCNR) and gNodeB functional units can be configured to apply different classes of service to the BDs/VLANs to prioritize, e.g., the F1-U interface on the midhaul network between the O-CU in the EDC and the O-DUs at the cell sites to facilitate better quality of experience for mobile data traffic. In some cases, some of the DU server interfaces are configured using bonded interfaces/link aggregation groups (LAGs), with one interface acting as active and another as standby. In this way, the vCNR-based switch can avoid running Spanning Tree Protocol (STP) because a single cascade interface to the active DU server is available at any moment despite the presence of multiple physical links from a supporting DU server to the active and standby DU servers.

In an example, a cell site for a 5G radio access network comprises: a plurality of Distributed Unit (DU) servers each comprising a virtualized cell site router (vCSR) having a containerized routing protocol process and a forwarding plane configured to perform Layer 2 (L2) switching, wherein a first DU server of the plurality of DU servers is connected by a first physical link to a second DU server of the plurality of DU servers and is connected by a second physical link to an L2 switch, wherein the forwarding plane of the vCSR of the first DU server is configured with interfaces for the first physical link and the second physical link, the interfaces configured with an L2 bridge domain, and wherein the forwarding plane of the vCSR of the first DU server is configured to switch an L2 packet, on the L2 bridge domain, between the second DU server and the L2 switch.

In an example, a method comprises receiving, at a forwarding plane of a virtualized cell site router (vCSR) of a first Distributed Unit (DU) of a plurality of DU servers of a cell site for a 5G radio access network, the vCSR having a containerized routing protocol process and a forwarding plane configured to perform Layer 2 (L2) switching, an L2 packet on a second interface for a second physical link connecting the first DU server to an L2 switch; and switching, by the forwarding plane of the vCSR of the first DU, the L2 packet on a first interface for a first physical link connecting the first DU server to a second DU server of the plurality of DU servers.

In an example, a computing system comprises a plurality of Distributed Unit (DU) servers each comprising a virtualized cell site router (vCSR) having a containerized routing protocol process and a DPDK-based forwarding plane configured to perform Layer 2 (L2) switching, wherein a first DU server of the plurality of DU servers is connected by a first physical link to a second DU server of the plurality of DU servers and is connected by a second physical link to an L2 switch, wherein the forwarding plane of the vCSR of the first DU server is configured with interfaces for the first physical link and the second physical link, the interfaces configured with an L2 bridge domain, and wherein the forwarding plane of the vCSR of the first DU server is configured to switch an L2 packet, on the L2 bridge domain, between the second DU server and the L2 switch.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
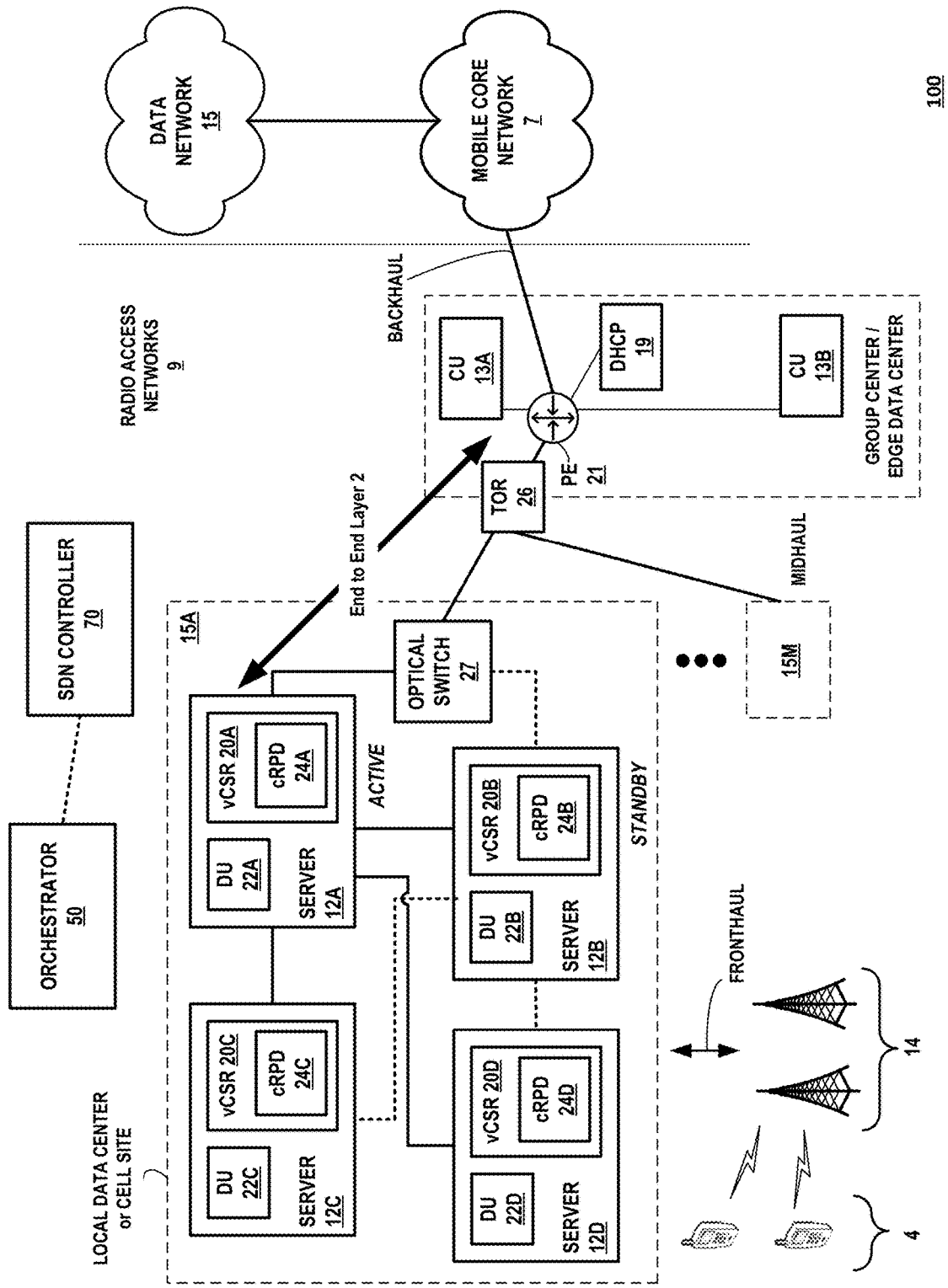
FIG. 1 is a block diagram illustrating an example mobile network system, in accordance with techniques described in this disclosure.

Zero Touch Deployment (ZTD) allows an operator to deploy new devices to a network automatically, i.e., without manual intervention. In a physical access network, a physical device is connected to the network and booted with the default factory configuration. The device then attempts to automatically configure itself using configuration information available on the network. Such configuration typically includes network configuration in which the newly deployed device uses Dynamic Host Configuration Protocol (DHCP) messages to obtain an IP address for its physical interface. Once the device has an IP address, the device can communicate on the network to obtain other configuration information from a configuration server (e.g., a File Transfer Protocol (FTP) or Trivial FTP (TFTP) server), such as updated application software and operational configuration data that the operator has created for its network and that defines the operation of this device. ZTD in this way allows the operator to deploy many hundreds or even thousands of devices from a central location without manual intervention with respect to configuration.

5G mobile networking relies on radio technology that will require a large number of cells and base stations. 5G uses a cloud native approach in which functional blocks are decomposed into microservices. The microservices are deployed as containers on x86 platforms, orchestrated by Kubernetes (abbreviated as "K8s"). This includes 5G core control plane functions such Access and Mobility Management Function (AMF) and Session Management Function (SMF), RAN control plane functions such as centralized unit control plane (CU-CP), service management and orchestration (SMO), Near-Real Time & Non-Real Time Radio Intelligent Controller (RIC) and even some data-plane functions such as CU-DP and distributed unit (DU).

Kubernetes networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a telecommunications network. A containerized router, as described herein, provides a better fit for these situations. A containerized router allows an x86 or ARM based host to be a first-class member of the network routing system, participating in protocols such as Intermediate System to Intermediate System (IS-IS) and Border Gateway Protocol (BGP) and providing Multiprotocol Label Switching/Segment Routing (MPLS/SR) based transport and multi-tenancy. In other words, rather than the platform being an appendage to the network (like a customer edge (CE) router), it may be operating as a provider edge (PE) router.

A containerized router may have one or more advantages over a conventional physical router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the containerized router is a virtualized router. However, the routing protocol software is functionally similar in both cases. This means the containerized router benefits from the same highly comprehensive and robust protocol implementation as the hardware-based routers that underpin some of the world's largest networks.

The containerized router uses a containerized routing protocol daemon (CRPD) Control Plane and a virtual router (vRouter) forwarding plane to deliver high performance networking in a small footprint, software package that is functionally similar to a non-virtual router, a physical network function (PNF). The forwarding plane may be implemented via a choice of Data Plane Development Kit (DPDK), Linux Kernel or Smart-NIC. The complete integration of cRPD and the virtual router delivers a K8s CNI-compliant package, deployable within a K8s environment (e.g., Multus-enabled). In some cases, the containerized router may be use multiple types of forwarding planes concurrently.

The containerized router may be incorporated into the host on which it resides and integrated with Kubernetes. By way of example, this disclosure describes a DU and a containerized router co-existing on x86, ARM based host, or other computing device, which may conform to same 1U size in some examples. This is especially attractive for those cell-sites that have limited power and space, as it avoids the need for a two-box solution, in the form of a separate DU and router. Multiple O-DUs, or other workloads, can be attached to the same containerized router.

Cell-site servers may be a Kubernetes worker node (or "minion"). Because their primary function is to execute DU workloads, cell-site servers may alternatively referred to herein as "DU servers." The O-DU pod is plumbed into the containerized router. The O-DU may require multiple network interfaces, facilitated in some cases by the Multus meta-CNI. Each of these interfaces can, in some deployments, be mapped into a different Layer 3 VPN on the containerized router to support multiple network slices. A CNI described herein, when triggered by Kubernetes pod events, dynamically adds or deletes interfaces between the pod and the vRouter container. It also dynamically updates the cRPD control plane container with host routes for each pod interface and corresponding Layer 3 VPN mappings, in the form of Route Distinguishers and Route Targets. The Layer 3 VPNs may be implemented using virtual routing and forwarding instances (VRFs). In turn, the cRPD control plane may program the vRouter forwarding plane accordingly via a gRPC interface. In this way, the Cloud Native Router can be introduced into the data path, supporting the F1 interfaces to the CUs running in edge or regional DC sites. While described primarily with respect to O-RAN applications such as the Distributed Units, the containerized router techniques are applicable for configuring host-based virtual routers for other containerized applications.

As the containerized router is itself a cloud native application, it supports installation using Kubernetes manifests or Helm Charts. These may include the initial configuration of the router, including routing protocols and Layer 3 VPNs to support slices. These may include configuration of physical and/or virtual network interfaces for workloads, among DU servers, upstream toward the Group Center/Edge Data Center (GC/EDC) and/or active/standby DU servers, or downstream to cascaded supporting DU servers and/or RUs. A containerized router may be orchestrated and configured, in a matter of seconds, with all of the routing protocol adjacencies with the rest of the network up and running. Ongoing configuration changes during the lifetime of the containerized router, for example to add or remove network slices, may be via a choice of CLI, Kubernetes manifests, NetConf or Terraform.

By adopting a Kubernetes CNI framework, the containerized router may mitigate the traditional operational overhead incurred when using a containerized appliance rather than its physical counterpart. By exposing the appropriate device interfaces, the containerized router may normalize the operational model of the virtual appliance to the physical appliance, eradicating the barrier to adoption within the operator's network operations environment. The containerized router may present a familiar routing appliance look-and-feel to any trained operations team. The containerized router has similar features and capabilities, and a similar operational model as a hardware-based platform. Likewise, a domain-controller can use the protocols that it is uses with any other router to communicate with and control the containerized router, for example Netconf/OpenConfig, gRPC, Path Computation Element Protocol (PCEP), or Programmable Routing Protocol Daemon (pRPD) APIs.

The computing device executing a containerized router may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The containerized router acts as a provider edge (PE) router from the Layer 3 VPN point of view. The containerized router can therefore exchange Layer 3 VPN prefixes via BGP with other PE routers in the network, regardless of whether those other PEs are physical routers or containerized routers residing on other hosts. Each tenant may be placed in a separate VRF table on each PE, giving the correct degree of isolation and security between tenants, just as with a conventional Layer 3 VPN service. This neatly solves the problem that Kubernetes does not natively provide such isolation. Layer 3 VPN is a tried and tested method for achieving multi-tenancy in networking and is trusted by the many major corporations worldwide who buy this service from their network service providers. In addition to Layer 3 VPN services, the techniques may be used to provision other VPN services such as Virtual Private LAN Service (VPLS), Ethernet VPNs, or other Layer 2 or Layer 3 VPNs.

Usually, the transport network offers a variety of paths, each tuned to a particular cost-function such as minimum latency or high-bandwidth. These are implemented using Segment Routing flex-algo, RSVP, or Segment Routing-based traffic engineering. When traffic-engineering is used, the paths can be computed by a controller and communicated to the Cloud native Router via the PCEP protocol. When the controller detects congestion in the network via streaming telemetry, it automatically recomputes the affected paths to ease the congestion. PE routers, including the containerized routers, apply tags (BGP color communities) to the prefixes in a given VRF according to the type of path that the corresponding slice needs. For example, a first slice may need the lowest latency transport that is possible, and so is mapped to a low-latency path in order to reach the O-CU in an Edge Data Center (EDC). A second slice needs high bandwidth with reasonably low latency. Therefore, its O-CU is also located in the EDC, and the traffic is mapped to a high-bandwidth path to the EDC. A third slice needs high-bandwidth transport but is not latency-sensitive, so its O-CU may be placed in the Regional Data Center (RDC). Traffic for the third slice is mapped into the high-bandwidth path to the RDC. In actual deployments, in which there will be many more slices, the mapping of slices to a transport path will normally be many-to-one. For example, all of the slices that need low-latency transport between a given pair of endpoints may share the same low-latency traffic-engineered or flex-algo path that connects those two endpoints.

The containerized router may in this way bring the full spectrum of routing capabilities to compute platforms that host containerized network functions. This may allow the platform to fully participate in the operator's network routing system and facilitate multi-tenancy and network slicing. It may provide the same familiar look-and-feel, operational experience and control-plane interfaces as a hardware-based router.

The containerized router may operate within a cloud native orchestration framework. In the Kubernetes orchestration framework, containerized applications are deployed using a logically-related group of one or more containers ("Pod"). The Pod may support the Data Plane Development Kit (DPDK) to support fast path packet communication on a data channel between a virtual router and the Pod. A container networking interface plugin (CNI) is a networking solution for application containers and is a runtime executable that assists with configuring interfaces between containers and other components of the computing device ("host") hosting the container, which may be a member of a pod. The computing device may be alternatively referred to as a "compute node" or "server". The CNI typically assigns the network address (e.g., IP address) to the network interface and may also add routes relevant for the interface, such as routes for the default gateway and one or more nameservers. However, network addresses may alternatively be assigned by a DHCP server, as described in further detail below.

A virtualized cell-site router (vCSR) is described with containerized applications for implementing distributed units (DUs) on servers. At least in some cases, the servers include a DPDK-based virtual router for the data plane. The vCSR includes a cRPD control plane and a forwarding/data plane.

A containerized routing protocol daemon (CRPD) is a routing protocol process that is packaged as a container to run in Linux-based environments. Thus, cRPD is a containerized routing protocol process. cRPD may be executed in the user space of the host as a containerized process. Thus, cRPD makes available the rich routing software pedigree of physical routers on Linux-based compute nodes. cRPD provides control plane functionality. Existing implementations of cRPD (running on the host) use the forwarding provided by the Linux kernel. This control plane is thus containerized.

A virtual router (vRouter) is the software entity that provides data plane functionality on the compute node. The compute node may be hosting virtual machines or containers centrally orchestrated and provisioned. The virtual router may work with an SDN controller to create the overlay network by exchanging routes, configurations, and other data. A virtual router can run as a Linux kernel module, DPDK-based process, or on a SmartNIC, for instance. DPDK allows a virtual router to process more packets per second than is possible when running as a kernel module. This virtual router data plane may be containerized. In combination, the containerized cRPD and containerized DPDK-based virtual router may thus be a fully containerized router and, when deployed at a cell site, may be considered a vCSR. In some examples of the containerized router, however, only the cRPD is deployed as a container, and the virtual router can be kernel-based or SmartNIC-based.

The compute node may be used to implement parts of a 5G cellular network using cloud native, Open Radio Access Network ("O-RAN" or "Open RAN") architecture. The cloud may be built with containers and Kubernetes. The cell-site router functionality may be realized on compute nodes that host Distributed Unit (DU) 5G functionality as containerized applications. That is, DU functionality may be realized as Kubernetes Pods on these compute nodes. At a very high level, the DU functionality will consume RAN traffic, process it, and send it over tunnels to the Centralized Unit functionality (CU) hosted in a data center.

To meet the rich routing functionality and forwarding performance requirements for this 5G network use case, the compute nodes may be configured to use an integrated scheme in which a cRPD running on the compute node operates as the control plane and configures a DPDK-based virtual router as a corresponding fast path forwarding plane for mobile network traffic that is to be processed by a containerized DU.

A containerized routing protocol daemon (CRPD) can interface with two separate data planes of a compute node on which is executes: the kernel network stack for the compute node and the DPDK-based virtual router. The cRPD may leverage the kernel's networking stack to set up routing exclusively for the DPDK fast path. The routing information cRPD receives can include underlay routing information and overlay routing information. The cRPD may run routing protocols on the vHost interfaces that are visible in the kernel, and the cRPD may install forwarding information base (FIB) updates corresponding to interior gateway protocol (IGP)-learned routes (underlay) in the kernel FIB (e.g., to enable establishment of multi-hop interior Border Gateway Protocol (iBGP) sessions to those destinations). Concurrently, the DPDK-based virtual router may notify the cRPD about the Application Pod interfaces created by the CNI for the compute node. Such Pod interfaces may not be advertised to or otherwise made known to the kernel. The cRPD may advertise reachability to these Pod interfaces to the rest of the network as, e.g., L3VPN network layer reachability information (NLRI). Corresponding Multi-Protocol Label Switching (MPLS) routes may be programmed on the virtual router but not to the kernel, for the next-hop of these labels is a "POP and forward" operation to the Pod interface, and these interfaces are only visible in the virtual router. Similarly, reachability information received over BGP L3VPN may only be programmed to the virtual router, for only PODs need such reachability information for forwarding. That is, the kernel may not have any use for or applications that need such reachability information.

When adding the DPDK interface to an application Pod instantiated on a compute node, the CNI may also add a second, management interface into the application Pod. The management interface may be configured on a different data plane within the compute node than from the active data plane on which the active interface is configured. For example, the active data plane may be a DPDK-based virtual router, while the backup data plane may be a kernel-based virtual router.

A set of software components provides CNI functionality that address networking requirements unique to cloud native 5G network environments. The software components include a containerized routing protocol daemon (cRPD) and may support a Network Service Mesh (NSM) architecture. The set of software components supports an NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc. In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components may in some examples use cRPD to distribute Layer 3 (L3) network reachability information of the Pods not just within the cluster, but also outside the cluster. The cRPD also programs the data plane on each compute node. For better network packet I/O performance, the DU application may run in the application Pod to bypass the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a user space data plane that leverages DPDK for high forwarding performance for this purpose.

The software components may include a DPDK-based virtual router to support DPDK applications. A CNI plugin may in some examples be used to manage the DPDK configuration for application and programs the virtual router. This may include setting up a vhost control channel and assigning IP (e.g., both IPv4 and IPV6) and MAC addresses, advertising the Pod IP addresses, and detecting and withdrawing the routes when the Pod is considered down or removed.

The various aspects described in this disclosure may be used together in any combination of the aspects. "DAY ONE: CONTRAIL DPDK vROUTER," 2021, Kiran K N et al., Juniper Networks, Inc., is incorporated by reference herein in its entirety. "DAY ONE: CLOUD NATIVE ROUTING WITH CRPD," 2021, Hitesh Mali et al., Juniper Networks, Inc., is incorporated by reference herein in its entirety. Additional details for a virtual cell site router and deployment are found in U.S. Publication No. 2022/0279420, published Sep. 1, 2022, which is incorporated by reference herein in its entirety. Not all examples and functionalities described above are incorporated into every example deployment of the system. For example, not all vCSRs may exhibit L3 and VPN functionality.

FIG. 1 is a block diagram illustrating an example mobile network system, in accordance with techniques described in this disclosure. Mobile network system 100 may be a 5G network that implements 5G network standards promulgated by, e.g., the 3rd Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control and user plane separation (CUPS). This decoupling helps bring flexibility to deployment-different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively. Additional data plane elements known as user plane functions (UPFs-not shown in FIG. 1) operate in mobile core network 7 to forward traffic between the CU and data network 15. Additional control plane elements (not shown in FIG. 1) operate in mobile core network 7. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 9 and mobile core network 7. Radio access networks 9 include RUs 14 located at various cellular network sites ("cell sites"). Each RU 14 consists of an LO PHY and a RF transmitter. The LO PHY component may be implemented using specialized hardware for high-performance packet processing. RUs 14 communicate with User Equipment (UE) 4 to provide access to cellular services. Each of UE 4 represent a wireless mobile device such as a cellular phone or personal digital assistant, mobile access card, hot spot, wireless access points, other cellular network subscriber device, a gaming devices, a modem, or other device that accesses services of mobile network system 100 to send and receive mobile data traffic.

RUs 14 connect to DUs 22A-22D (collectively, "DUs 22") via the fronthaul network. The fronthaul network connects LO PHY and HI PHY and is used by RUs 14 and DUs 22 to implement the F2 interface of 5G. DUs 22 manage the packet transmission of radio by the RUs 14. In some cases, such packet transmission conforms to the Common Packet Radio Interface (CPRI) and/or to the enhanced CPRI (eCPRI) standard, or to IEEE 1914.3. DUs 22 may implement the Radio Link Control (RLC), Media Access Control (MAC), and the HI PHY layer. DUs 22 are at least partially controlled by CUs 13A-13B (collectively, "CUs 13").

DUs 22 connect to CUs 13 via the midhaul network including provider edge (PE) router 21 and Top-of-Rack (TOR) switch 26. The midhaul network may be used by DUs 22 and CUs 13 to implement the F1 of 5G. CUs 13 may implement the Radio Resource Control (RRC) and Packet Data Convergence Protocol (PDCP) layers. CUs 13 connect to mobile core network 7 via a backhaul network. The midhaul and backhaul networks may each be wide area networks (WANs).

In radio access networks 9 of mobile network system 100, the gNodeB includes one of CUs 13 and one of DUs 22. A CU may support multiple DUs to implement multiple gNodeBs. And one or more RUs may be supported by a single DU. Thus, for example with respect to FIG. 1, CU 13A and DU 22A and one of RUs 14 may form one eNodeB, while CU 13A and DU 22B (of server 12B) and another one of RUs 14 may form another eNodeB.

Any DU of DUs 22 may or may not be located at the cell site that includes the RU(s) 14 supported by the DU. Local data center or cell sites 15A-15M (hereinafter and collectively, "cell sites 15") may represent local data centers and/or cell sites that support RUs 14. A group center/edge data center (GC/EDC) typically supports around 20 cell sites. RANs 9 may include many thousands to hundreds of thousands of cell sites 15, supported by hundreds of GC/EDCs, in turn supported by regional data centers (not shown).

Whether located at a cell site or offsite at a local data center, a DU is typically within 20 km of the supported RUs. CUs 13 are shown in FIG. 1 as located at a GC/EDC, typically within 40 km of the supported DUs 22.

Radio access networks 9 connect to mobile core network 7 to exchange packets with data network 15. Mobile core network 7 may be a 5G core network, and data network (DN) 15 may represent, for example, one or more service provider networks and services, the Internet, $3^{rd}$ party services, an IP-multimedia subsystem, or other network.

Mobile network system 100 includes multiple servers 12A-12D (collectively, "servers 12") to execute respective DUs 22. Servers 12 may alternatively be referred to herein as "DU servers." Each of servers 12 may be a real or virtual server that hosts/executes software that implements DUs 22. Such software may include one or more applications deployed as, e.g., virtual machine or containers, to servers 12. Any of servers 12 may execute one or more instances of DUs 22. While not shown in FIG. 1, CUs 13 may also be executed by servers.

The combination of DUs 22, the midhaul network, CUs 13, and the backhaul network may, in some examples of the described techniques, implement an IP-based transport network between the radio units 14 and mobile core network 7.

In accordance with techniques of one or more aspects of this disclosure, vCSRs 20A-20D (collectively, "vCSRs 20") are deployed to cell site servers (the DU servers 12) to support management and orchestration of functional units for mobile networks executing on the cell site servers. Virtualized cell site routers 20 implement L2 forwarding and operate as virtual L2 switches to support cascaded DU servers with active/standby failover and centralized IP address assignment using DHCP. Virtualized cell site routers 20 may in this way provide end to end L2 network connectivity among DUs 22, TOR switch 26, and PE 21.

In some examples, the cell sites 15 deployment may be subsequently migrated from a Layer 2 solution to a Layer 3 solution. A vCSR 20 may be executed on the same server 12 as one or more DUs 22 to provide provider edge router and/or virtual L2 switch functionality to such DUs 22. Such a Layer 3 approach/solution using VPNs is described in U.S. patent application Ser. No. 17/843,880, filed Jun. 17, 2022 and entitled "MULTI-STAGE VIRTUAL PRIVATE NETWORK SERVICE PROVISIONING FOR CONTAINERIZED ROUTERS," which is incorporated by reference herein in its entirety.

Cell site 15A is an example of cell sites 15 in detail. Cell site 15 include servers 12A-12D arranged in a particular physical topology with TOR switch 16 that connects cell sites 15 to PE router 21. Optical switch 27 may represent a 2-channel optical fiber bypass switch having Active/Standby switchover to automatically switch optical network traffic to prevent link failure during power loss or other failure event.

Active DU server 12A has physical network links with each of DU servers 12B-12D and with optical switch 27. Standby DU server 12B has physical network links with each of DU servers 12A-12D and TOR 26 via optical switch 27. Cascaded (or supporting) DU servers 12C-12D each has physical network links with active DU server 12A and standby DU server 12B, but not with TOR 26. Notably, cell site 15A does not include a dedicated physical L2 switch for switching packets among DU servers and TOR switch 26. Optical switch 27 is an optical switch and does not perform L2 forwarding/switching. Links connecting standby DU server 12B to other devices are shown in dashed line format to denote that such links are not currently actively transporting traffic. The term "physical network link" or "physical link" may refer to multiple physical links, one for each direction.

In this topology, cascaded DU servers 12C-12D can only reach TOR switch 26/PE 21/GC/EDC via one of DU servers 12A or 12B. In effect, the active one of DU servers 12A, 12B operates as a transit switch to enable end to end L2 connectivity between DUs 22C, 22D and PE 21. Although not shown in FIG. 1, each of DU servers 12 may have physical links to one or more RUs 14.

Each of vCSRs 20 is implemented with a corresponding one of containerized routing protocol daemons 24A-24D ("cRPDs 24A-24D" and collectively, "cRPDs 24"). More specifically, each of vCSRs 20 uses a corresponding cRPD of cRPDs 24 as a control plane for implementing a layer 2 switch and, in some cases, a layer 3 router. Orchestrator 50 may deploy cRPDs 24, e.g., using Kubernetes manifests or Helm charts, and in some cases DPDK-based virtual router forwarding planes to configure physical network interfaces and virtual network interfaces to implement end-to-end connectivity for the Layer 2 forwarding topology of DU servers 12, TOR switch 26, and PE 21.

vCSRs 20 enable Layer 2 communication among DU servers 12 of cell site 15A and TOR switch 26 in the illustrated physical network topology. This is described further with respect to vCSR 20A of DU server 12A but applies similarly to other vCSRs 20. As a virtual L2 switch, vCSR 20A forwards received network packets at the data link layer (layer 2) of the OSI model. vCSR 20A forwards a received network packet via an interface, which may be physical or virtual, based on the destination L2 (e.g., Media Access Control-MAC) address of the network packet. vCSR 20A may implement MAC learning. vCSR 20A may implement an Ethernet switch to create a separate collision domain for one or more interfaces of the vCSR 20. Each device or application connected to such an interface can transfer data to any of the other such interfaces at any time and the transmissions will not interfere. Because broadcasts are still being forwarded to all connected devices/applications by vCSR 20A, the network segment will remain a broadcast domain. The L2 switching functionality of vCSR 20A may be managed in part via cRPD 20A, which exposes a management interface that may be invoked by SDN controller 70 to manage L2 switching functionality and configure the interfaces. Alternatively or additionally, at least some of the L2 switching functionality may be managed by deploying cRPD 20A by orchestrator 50, as described above. Example management interfaces for cRPD 20A include command line interface (CLI), Simple Network Management Protocol (SNMP), web interface/GUI, and others. Example L2 switching functionality that can be managed includes enabling/disable Spanning Tree Protocol (STP) or port mirroring, configuring interface bandwidth, creating bonded interfaces, creating and managing Virtual Local Area Networks (VLANs) and bridging domains (BDs), and others.

In some examples, the cRPD may provide control plane routing functions. For example, the cRPD can execute IP (IPv4/IPv6) underlay routing protocols such as Intermediate System-Intermediate System (IS-IS) and Border Gateway Protocol (BGP); advertise reachability of DUs 22 both inside and outside a cluster, e.g., to CUs 13; implement network namespaces (supported using L3VPN and EVPN Type-2/Type-5 advertisements); implement Access Control Lists (ACLs) and network policies for security, network isolation, and quality of service (QOS); support tunnels and tunneling protocols (e.g., MPLS, SR-MPLS, SRv6, SR-MPLSoIPV6, SR-MPLSoIPv4, VxLAN, IP-in-IP, GRE); support dynamic tunnels signaled using BGP; support encryption for IPSec tunnels; and program a forwarding plane of the vCSR of the server with learned and/or configured routing information to provide layer 3 packet forwarding, encapsulation, packet filtering, and/or QoS between one or more of DUs 22 and one of CUs 13. For example, vCSR 20A executed by server 12A includes cRPD 24A and a forwarding plane of server 12A (e.g., a SmartNIC, kernel-based forwarding plane, or Data Plane Development Kit (DPDK)-based forwarding plane). cRPD 24A may provide one or more of the above routing functions to program a forwarding plane of vCSR 20A in order to, among other tasks, advertise a layer 3 route for DU 22A outside of the cluster-including across the midhaul network via PE router 21 to CU 13A—and forward layer 3 packets between DU 22A and CU 13A.

In this way, the techniques can realize cloud native, virtualized cell site routers 20 implemented by containers and executing on the same servers 12 as containerized DUs 22, thus significantly reducing latency on the midhaul between DUs 22 and CUs 13 while enabling a cascaded DU servers with active/standby failover and centralized IP address assignment from DHCP server 19 (with PE router 21 performing DHCP relay).

Provider edge (PE) router 21 operates as a gateway router for radio access network 9 and may be considered a metro PE in that it aggregates traffic for the access network toward the service delivery points. The midhaul network may include one or more layer 2 switches, including TOR switch 26, aggregation, or chassis switches. The backhaul network may include one or more layer 2 switches, such as Top-of-Rack (TOR) switches, aggregation, or chassis switches, additional P (core) or PE routers, and so forth.

In some examples that enable a Layer 3 deployment, vCSRs 20 as containerized routers allow an x86-based or ARM-based host to be a first-class member of the network routing system, participating in protocols such as IS-IS and BGP and providing MPLS/SR-based transport and multi-tenancy. Thus, rather than being appendages to the network (similar to a customer edge (CE) router), vCSRs 20 may operate as provider edge (PE) routers for networks transporting layer 3 packets among DUs 22, CUs 13, and mobile core network 7. As noted above, an example Layer 3 deployment using VPNs is described in U.S. patent application Ser. No. 17/843,880.

Moreover, in some examples, the integration of cRPDs 24 and host-based forwarding planes may also deliver a Kubernetes CNI-compliant package that is deployable within a Kubernetes environment. The execution by a single server of a DU 22 and a vCSR 20 together can avoid a two-box solution with a separate DU and router, potentially reducing costs, power, and space requirements, which is particularly attractive for cell sites. Application workloads can be containerized network functions (CNFs), such as DUs. By using operating vCSRs 20 as virtual switches, DU servers 12 can also avoid the need to deploy a separate physical or virtual L2 switch for the links connecting cell site 15 with TOR switch 26. In some cases, a single physical paired optical link between TOR switch 26 and optical switch 27 transports all traffic between cell site 15A and TOR switch 26.

Orchestrator 50 represents a container orchestration platform. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS. Orchestrator 50 orchestrates DUs 22 and at least cRPDs 24 of vCSRs 20. In some examples, the data plane of vCSRs 20 is also containerized and orchestrated by orchestrator 50. The data plane may be a DPDK-based virtual router, for instance.

Containers, including those implementing containerized routing protocol daemons 24, may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master node" and "minion nodes," while the Docker Swarm platform refers to cluster managers and cluster nodes. Servers 12 or virtual machines thereon may represent cluster nodes.

Orchestrator 50 and software defined network (SDN) controller 70 may execute on separate computing devices or execute on the same computing device. Not all deployments involve or require SDN controller 70. Each of orchestrator 50 and SDN controller 70 may each be a distributed application that executes on one or more computing devices. Orchestrator 50 and SDN controller 70 may implement respective master nodes for one or more clusters each having one or more minion nodes implemented by respective servers 12. Orchestrator 50 and SDN controller 70 may execute on servers located in the GC/EDC, for instance. In general, SDN controller 70 controls aspects of the network configuration of radio access network 9 to facilitate packetized communications among DUs 22, CUs 13, and mobile core network 7. SDN controller 70 may distribute routing, forwarding, and configuration information to the control plane elements of radio access networks 9, in particular, to cRPDs 24. SDN controller 70 may, for instance, program segment routing headers, configure L3VPNs, configure VRFs in routers of radio access network 9 (including virtualized cell site routers 20). SDN controller 70 may implement one or more southbound protocols for configuring router, switches, and other networks devices of the midhaul and backhaul networks, as well as for configuring vCSRs 20. Example southbound protocols may include Path Computation Element Protocol (PCEP), BGP, Netconf, OpenConfig, another protocol for configuring cRPDs 24, and so forth. Additional information regarding L3VPNs is found in "BGP/MPLS IP Virtual Private Networks (VPNs)," Request for Comments 4364, Network Working Group of Internet Engineering Task Force, February 2006, which is incorporated by reference in its entirety.

SDN controller 70 may provide a logically and in some cases physically centralized controller. In some examples, SDN controller 70 may operate in response to configuration input received from orchestrator 50 and/or an administrator/operator. SDN controller 70 may program NFV infrastructure (NFVI) such as servers 12, DHCP server 19, network switches/routers, and/or other network infrastructure. In the case of NFVI programming, SDN controller 70 may configure aspects of the operating system kernel to configure L3 IP routing, Linux bridges, iptables, network namespaces, and/or virtual switches.

Additional information of an example SDN controller 70, virtual router, and virtual router agent is found in International Application Number PCT/US2013/044378, filed Jun. 5, 2013, and entitled "PHYSICAL PATH DETERMINATION FOR VIRTUAL NETWORK PACKET FLOWS;" U.S. patent application Ser. No. 14/226,509, filed Mar. 26, 2014, and entitled "Tunneled Packet Aggregation for Virtual Networks;" and in U.S. patent application Ser. No. 17/305, 110, filed Jun. 30, 2021, and entitled "Network Controller Horizontal Scaling for Network Device Configurations Session Management;" each which is incorporated by reference as if fully set forth herein.

In general, orchestrator 50 controls the deployment, scaling, and operations of containers across clusters of servers 12 and the providing of computing infrastructure, which may include container-centric computing infrastructure. Orchestrator 50 and, in some cases, SDN controller 70 may implement respective cluster masters for one or more Kubernetes clusters. As an example, Kubernetes is a container management platform that provides portability across public and private clouds, each of which may provide virtualization infrastructure to the container management platform.

Existing mobile networks use a physical cell site router that is located on or close to each BBU. Physical routers often have specialized form factors, are relatively difficult to update and configure, and are relatively difficult to replace due to vendor lock-in effects. While these effects are tolerable where there are relatively few cell sites, as with 3G and 4G/LTE mobile networks, the comparatively large number of cell sites required by RANs for 5G mobile networks exacerbates the capital and operational costs related to these effects. And although 5G network providers are moving to a disaggregated RAN architecture (e.g., O-RAN), such networks still rely on a physical cell site router or a virtual machine-based router to manage routes and data traffic between the DU and the CU over the midhaul network.

Virtualized cell site routers 20 having containerized routing protocol daemons 24 alleviate many of the negative effects of deploying physical or VM-based routers at the cell site. For example, cRPDs 24 are more light-weight in terms of compute resources (CPU, memory) compared to VM-based routers and may be more efficient in terms of space and power utilization than VM-based and physical routers. Virtualized CSRs 20 may achieve these advantages while achieving comparable performance where DPDK-based virtual routers are used as the data plane to provide efficient and high packet I/O rate for vCSRs 20 to communicate with DUs 22. That is, having vCSR 20A and DU 22A (e.g., an O-DU) on a single physical server 12A with DPDK-based data plane can offer packet forwarding performance on par with a physical cell site router. As further examples of technical advantages, vCSRs 20 may eliminate the need for a physical cell site router and may reduce the space, reduce power consumption, and also reduce capital/operational expenditures. Additionally, in some examples and as described in further detail below, vCSRs 20 can be integrated into a Kubernetes infrastructure by presenting vCSRs 20 as Container Networking Interfaces (CNIs) to the orchestration platform, usable for configuring networking for the application workloads. Thus, by deploying containerized vCSRs 20/cRPDs 24 for use as CNIs, integrating into mobile network system 100, and integrating into Kubernetes, the techniques may facilitate a cloud native experience for vCSR 20 deployment and configuration. Integrating in Kubernetes permits leveraging its existing mechanisms for monitoring the health of cRPD 24s and restarting if necessary, along with managing the life-cycle of the vCSRs 20 and in particular, cRPDs 24.

An interface for each of vCSRs 20, DUs 22, and PE 21 are all configured with a layer 2 (L2) bridge domain for management traffic. PE router 21 may also be configured with the L2 bridge domain. In some cases, an interface for each of RUs 14 is also configured with the L2 bridge domain for management traffic. PE router 21 may have an integrated routing and bridging instance (IRB) interface having a bridge domain that is the L2 bridge domain for management traffic, on the midhaul network. PE router 21 may perform DHCP relay to relay DHCP messages between the midhaul network and DHCP server 19, for instance or, for layer 2, snoop DHCP messages and rebroadcast the DHCP messages to DHCP server 19. The L2 bridge domain may be referred to as a management domain or L2 management domain and operates as a Layer 2 Operations, Administration, and Management (OAM) and management plane. DHCP server 19 is a DHCP server configured to assign IP addresses in the network subnet to applications and devices in RANs 9. DHCP server 19 may be integrated within PE router 21 in some examples.

Figure 2:
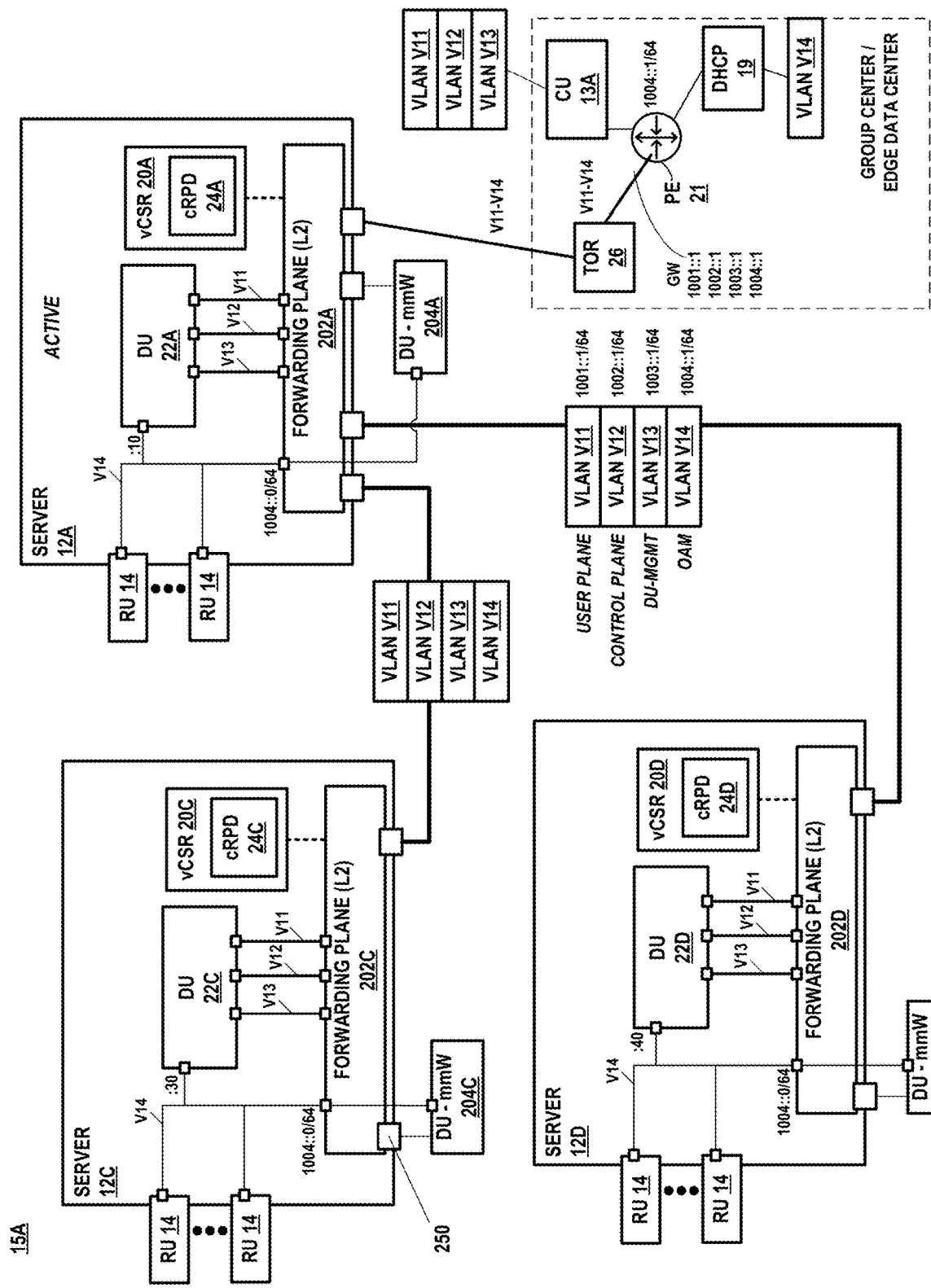
FIG. 2 is a block diagram illustrating an example cell site of FIG. 1 in further detail, according to techniques of this disclosure.

FIG. 2 is a block diagram illustrating an example cell site of FIG. 1 in further detail, according to techniques of this disclosure. Cell site 15A in FIG. 2 includes servers 12A, 12C, and 12D, but server 12B is not shown for ease of illustration purposes, for server 12A is the active DU server in this example. Cell site 15 as shown has no overlay network (e.g., VPN) and is instead a "pure" L2 network implemented at least in part by vCSRs 20A-20D having respective forwarding planes (L2) 202A-202D (collectively, "forwarding planes 202"). Thus, all interfaces for a bridge domain can be in the same subnet and compatible with the customer's network/subnet configuration in the GC/EDC, and IP addresses can be assigned from a DHCP server 19 in the GC/EDC, thus simplifying configuration of the cell sites 15. Whereas a Layer 3 (L3) approach with overlay networks would be difficult to configure in view of the disjoint physical topology of servers 12, with interfaces situated on different subnets, the L2 approach enabled by vCSRs 20 facilitates a common L2 network for servers 12 and, therefore, devices accessible via servers 12 including RUs 14, DUs 22, and DU-millimeter wave (DU-mmW) devices204.

Although not shown, each of DU servers 12 includes one or more processors having access to a storage device comprising instructions. The processors execute the illustrated components, including DUs 22 and vCSRs 20. Each of servers DU servers 12 also includes one or more network interface cards each having one or more physical network interfaces (ports).

Devices include both physical devices such as TOR switch 26 and PE 21 and virtual devices such as vCSRs 20 (including forwarding planes 202), DUs 22, and RUs 14. DU-mmW devices 204A-204D are connected to interfaces for respective DU servers 12 and may represent separate DU devices for DU-mmW functionality. The devices of cell site 15A and the GC/EDC are configured with L2 bridge domains for isolated forwarding of different types of L2 traffic. VLAN/BD V11 is for user plane traffic (e.g., F1-U); VLAN V12 is for control plane traffic (e.g., F1-C); VLAN V13 is for DU-management traffic; and VLAN/BD V14 is for OAM traffic and may correspond to the L2 bridge domain for management traffic described above with respect to FIG. 1. Different devices have one or more interfaces for different sets of the various L2 bridge domains operating over the L2 physical network. For example, DUs 22 have virtual interfaces configured for each of V11-V14. RUs 14 and DU-mmW devices have virtual interfaces configured for V14. CU 13A in the GC/EDC has interfaces configured for each of V11-V13, for CU 13A implements the F1-U and F1-C interfaces and manages one or more DUs 22, but CU 13A is not assigned an IP address from DHCP 19 and therefore requires no interface configured for V14. Physical links connecting physical interfaces (ports) of DU servers 12B, 12D to physical interfaces (ports) of DU server 12A transport traffic for V11-V14. For ease of illustration, only one of the physical interfaces, port 250, is labeled, though other ports of servers 12 are also shown. Devices upstream of PE 21 (i.e., CU 13A and DHCP 19, may have interfaces for the bridge domain on a different subnet (e.g., 1004::1/64) and PE 21 operates as an IP gateway. The bridge domains V11-V14 eschew any overlay networks and can extend from the DHCP server 19 and CU 13A in the GC/EDC to the RU (in the case of the F1-U BD) and the O-DUs (all BDs).

PE 21 provides DHCP relay function for RUs 14 and DUs 22. DHCP-relay/OAM interfaces of DUs 22, RUs 14, and DU-mmw devices 204 connect at L2 via bridge domain V14 (alternatively referred to as the "OAM-BD", "RU-Mgmt," or the "L2 bridge domain for management traffic"). vCSRs 20 operating as virtual L2 switches perform L2 forwarding for bridge domain V14. Again, PE 21 may operate as the IP gateway. Multiple RUs 14 may connect via the SR-IOV Physical Function (PF) of physical network interfaces of each of DU servers 22 to exchange data traffic with the corresponding DUs 22 on the fronthaul network (PHY interface).

Figure 3:
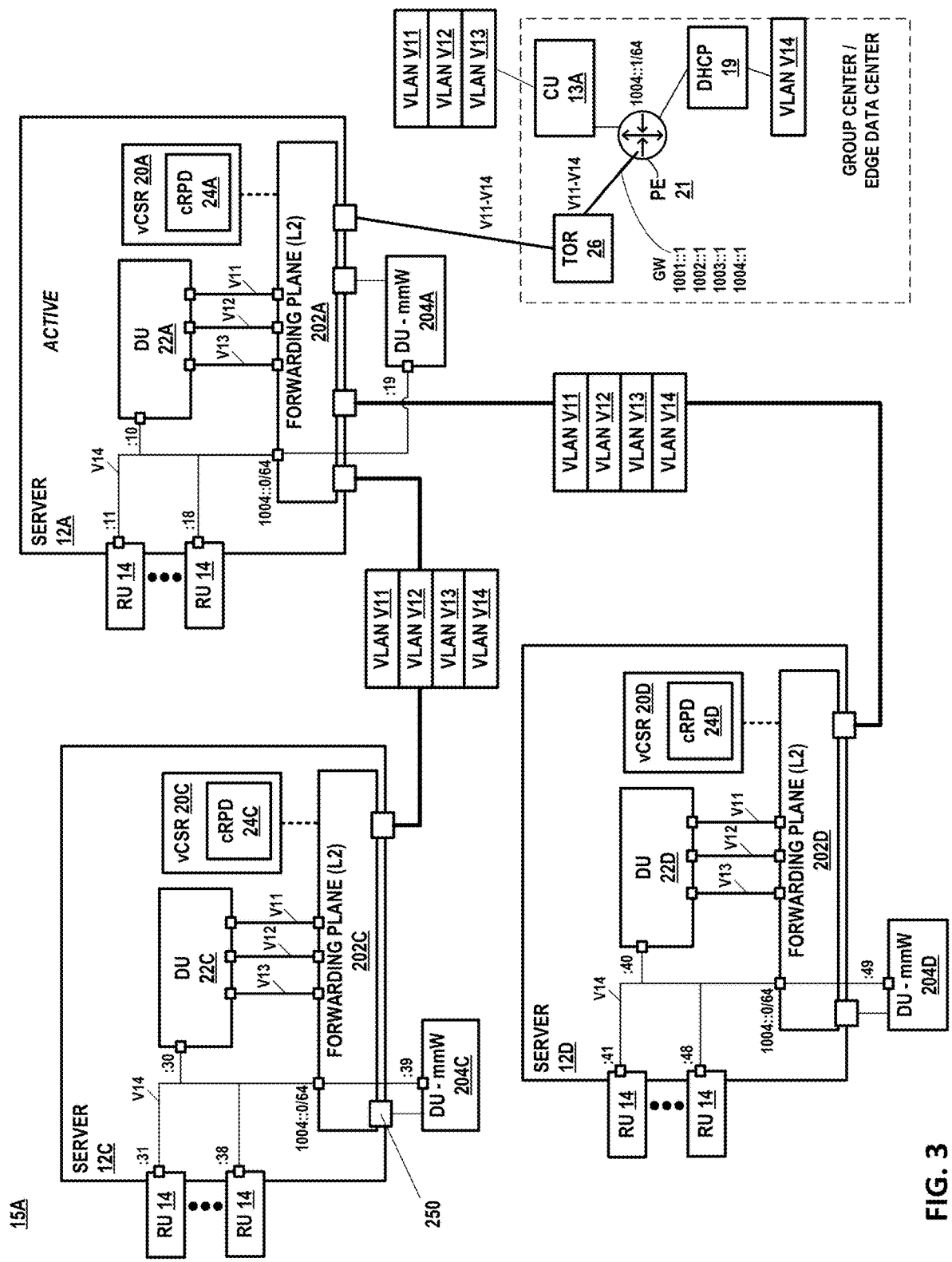
FIG. 3 is a block diagram illustrating the example cell site of FIG. 2, with interface network address assignments shown, according to techniques of this disclosure.

FIG. 3 is a block diagram illustrating the example cell site of FIG. 2, with interface network address assignments shown, according to techniques of this disclosure. DU server 12A has one or more RUs connected to the SR-IOV Physical Function (PF) of physical network interfaces of DU server 12A; the corresponding Virtual Function ("VF1" in this example) is configured for bridge domain V14. DU server 12A has DU-mmW 204A connected to the SR-IOV Physical Function (PF) of a physical network interface of DU server 12A; the corresponding Virtual Function (VF1) is configured for bridge domain V14. Forwarding plane 202A is configured with corresponding Virtual Interfaces (VIFs) for SR-IOV packet I/O with the VFIs for the RUs 14 and DU 22A; and forwarding plane 202A of vCSR 20A operates as a virtual L2 switch to forward bridge domain V14 traffic to, e.g., PE 21 acting as DHCP relay. DU servers 22C, 22D are configured similarly.

Using bridge domain V14, DU-mmW 204C and the RUs 14 connected to DU server 12C may obtain IP addresses from DHCP server 19 via PE 21 in the GC/EDC. DU-mmW 204C and the RUs 14 may execute DHCP clients. vCSRs 20 forward L2 management traffic on bridge domain V14. For example, an RU 14 connected to DU server 12C may broadcast, on bridge domain V14, a DHCP Discover message to obtain an IP address from DHCP server 19. The DHCP Discover message is received at forwarding plane 202C of vCSR 20C and broadcast on the interfaces of DU server 12C/vCSR 20C. The DHCP Discover message is received by active DU server 12A/forwarding plane 202A of vCSR 20A and broadcast on the interfaces of active DU server 12A/forwarding plane 202A of vCSR 20A, which includes the physical link to TOR switch 26, which forwards the DHCP Discover message to PE router 21. PE router 21 uses DHCP relay to relay the DHCP Discover message to DHCP server 19, which assigns an IP address to the RU 14 and replies with a DHCP Offer message. This message is returned to the RU 14 on the end to end L2 bridge domain V14 implemented by, e.g., TOR 26 and vCSRs 20, using the physical L2 network. The RU 14 is configured with the IP address assigned by DHCP server 19 and can now communicate using its IP address to exchange user plane traffic with DU 22C, for instance. The IP address may be IPV4 or IPV6 in various examples. A similar process may be performed by any of RUs 14 having a virtual interface (e.g., an SR-IOV Virtual Function) with any of the vCSR 20s forwarding planes. In this way, RUs 14 have IP addresses assigned. IPv6 addresses for RUs of server 12C include: 31 and: 38. The gateway IP address for the bridge domain is configured to be the PE router 21 address, 1004:: 1/64.

Although DUs 22 could obtain their IP address using a similar process as described above for RUs 14, DUs 22 are cloud native and have their IP addresses assigned via vCSR 20 IP Address Management (IPAM), which may be managed by orchestrator 50. Description of a cloud native router, as is some examples of vCSRs 20, can be found in "Juniper Cloud native Router Deployment Guide," Juniper Networks, Inc., Aug. 22, 2022, which is incorporated by reference herein in its entirety. In "Juniper Cloud native Router Deployment Guide," JCNR-Controller may correspond to cRPDs 24, and JCNR-vRouter may correspond to forwarding planes 202.

For example, orchestrator 50 may receive a network attachment definition (NAD), container specification data, Pod specification data, or Container Networking Interface (CNI) configuration that causes orchestrator 50 to direct a CNI plugin (not shown) to use IP Address Management (IPAM) to assign an IP address for DUs 22. DUs 22 are containerized applications and are provisioned accordingly. Orchestrator 50 may communicate with DU servers 12 using a separate management L2 bridge domain, e.g., V13 ("DU-MGMT"). In some examples, orchestrator 50 and SDN controller 70 coordinate to configure network interfaces for DUs 22.

In an aspect of the disclosure, a set of software components provides CNI functionality that address networking requirements unique to cloud native 5G network environments. The software components include a containerized routing protocol daemon (cRPD) to support a Network Service Mesh (NSM) architecture. The set of software components support a NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc.

In a use case of this aspect, a 5G O-RAN network may be deployed using cloud native technologies and follow the 5G split in which the DU (Distributed Unit) and CSR (Cell Site Router) are virtualized and run on a compute node. The set of software components may operate as a cell-site router to provide L3 reachability for the mid-haul for the 5G network.

The software components may use cRPD to distribute Layer 3 (L3) network reachability information of the Pods not just within the cluster, but also outside the cluster. The cRPD may program the data plane on each compute node. For better network packet I/O performance, the DU application may run in the application Pod to bypasses the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a user space data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPV6) and MAC addresses, advertising the Pod IP addresses, and detecting and withdrawing the routes when the Pod is considered down or removed.

Most of the existing use cases for cRPD either provide control-plane-only routing functionality such as BGP Route Reflectors or drive the forwarding-planes: kernel-based or ASIC based forwarding-plane on white box platforms. The rise of containers and cloud computing led to the need for container orchestration platforms to manage the life cycle of the containers. Kubernetes (K8s) is an orchestration platform for running containerized applications in a clustered computing environment. It provides automatic deployment, scaling, networking and management of containerized applications. A Kubernetes pod consists of one or more containers representing an instance of application and is the smallest unit that Kubernetes can handle. All containers in the pod share the same network namespace. Container Network Interface (CNI) provides networking for application pods in Kubernetes. For example, CNI takes care of setting up pod interfaces, address assignment and networking between pods in a k8s cluster and network isolation between different workloads.

A 5G O-RAN network may be deployed using cloud native technologies and follows 5G 7.2 split where the DU (Distributed Unit) and CSR (Cell Site Router) are virtualized and run on a server. vCSRs 20 can, in Layer 3 deployments, act as a cell-site router to provide L3 reachability for the mid-haul.

cRPDs 24 can distribute Layer-3 network reachability information of the Pods not just within a Kubernetes cluster (in Kubernetes deployments), but also outside the cluster. cRPDs 24 also take care of programming the forwarding-plane on each compute node/server.

For better network packet I/O performance, a DU application which runs in the application Pod bypasses the kernel networking stack and abstractions, and uses (zero-copy) mechanisms to directly send/receive packets from the physical NIC. Data Plane Development Kit (DPDK) is one such framework.

DPDK vRouter is a user space data-plane that leverages DPDK for high forwarding performance. vRouter supports DPDK applications. The CNI will take care of setting up DPDK configuration for applications and programming vrouter for some of the functional units. This includes setting up of vhost control channel and assigning IP (both IPv4 and IPV6) and MAC addresses, advertise the Pod IP addresses and detect and withdraw the routes when the Pod is considered down or removed.

Figure 4:
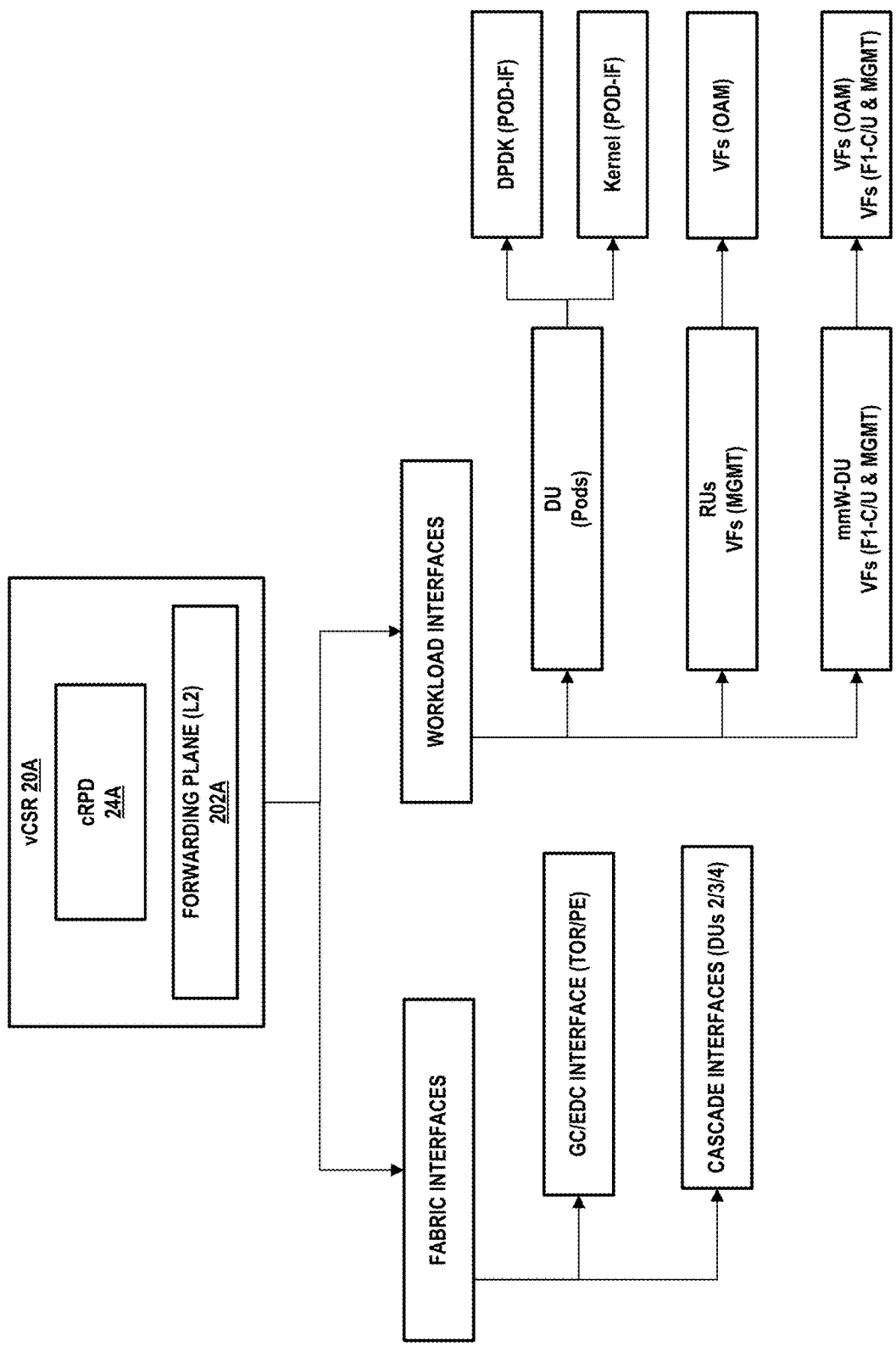
FIG. 4 is a block diagram conceptually illustrating various types of interfaces for virtualized cell site routers, according to techniques of this disclosure.

FIG. 4 is a block diagram conceptually illustrating various types of interfaces for virtualized cell site routers, according to techniques of this disclosure. These are described with respect to vCSR 20A and DU server 12A.

In general, workload interfaces are configured when the workload is connected or provisioned. Provisioned workloads include DU 22A, which may be deployed as Pods and provisioned using Kubernetes manifest/Helm charts using annotations to the vCSR 20A Pod manifests and/or network attachment definition (NAD). Examples of DU 22A Pods may include those configured with DPDK (virtio-user, DPDK-based vRouter) interfaces and those configured with kernel-based interfaces (kernel-based vRouter) for bridge domains V11-V14. RUs 14 have workload connections, and Virtual Functions (VF1s) provisioning for bridge domain V14 may be performed using vCSR 20A configuration according to configuration templates. DU-mmW 204A has a workload connections, and Virtual Functions (VF1s) provisioning for bridge domains V11-V14 may be performed using vCSR 20A configuration according to configuration templates. vCSR 20A pushes the interface configurations to forwarding plane 202A, e.g., via an interface (e.g., gRPC interface) with a vRouter agent for the forwarding plane. Although not shown in FIGS. 2-3, DU-mmW 204A may have interfaces configured for V11-V13 as well as V14. As a result of using a configuration template with a "full-fledged" router in the form of vCSR 20A, a separate SDN controller 70 with a separate control plane for networking configuration of the interfaces can, in some examples, be avoided.

Fabric interfaces can be SR-IOV Virtual Functions or Physical Functions, though VFs are preferable. The fabric interfaces include the physical interface with TOR switch 26/PE 21, and the cascade interfaces among the DU servers 12. For vCSR 20A of DU server 12A, this includes cascade interfaces to DU servers 12B, 12C, and 12D.

Figure 5A:
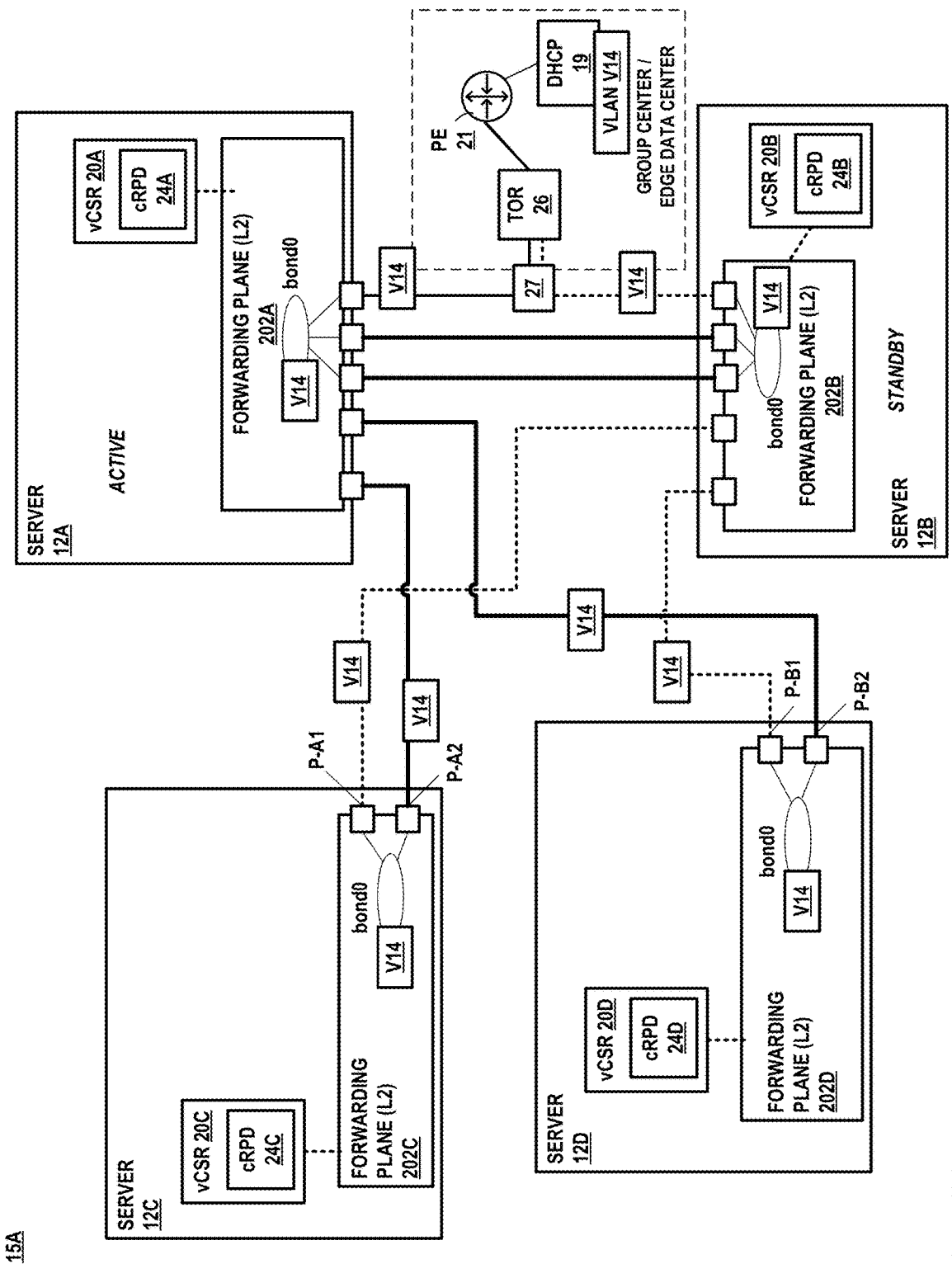
FIGS. 5A-5B are block diagrams illustrating a failover operation among DU servers configured with bonded interfaces in a cell site, in accordance with techniques of this disclosure.
Figure 5B:
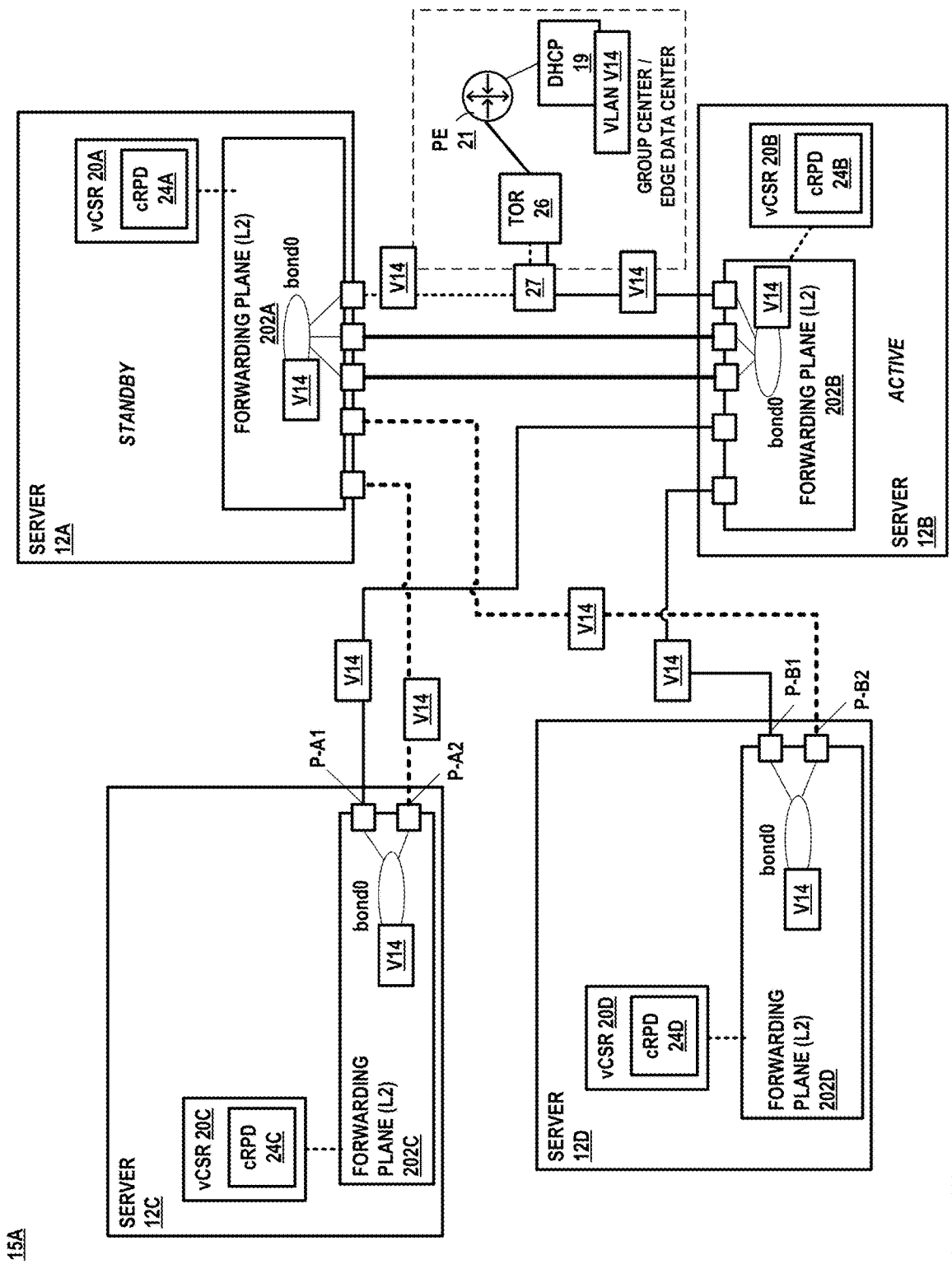

FIGS. 5A-5B are block diagrams illustrating a failover operation among DU servers configured with bonded interfaces in a cell site, in accordance with techniques of this disclosure. To enable active/standby failover in the L2 physical network topology in which DU servers 12 are arranged, selected interfaces of DU servers 12 are configured as bonded interfaces, which may include Link Aggregation Groups (LAGs). One interface of the bonded interface operates as active, while the other one or more interfaces of the bonded interface operate as standby. Optical switch 27 is on, which activates the link optical link between TOR 26 and DU server 12A, making server 12A the active server.

In the illustrated example of FIG. 5A, cascaded server 12C has physical interfaces P-A1 and P-A2 with links to standby server 12B and active server 12A, respectively; cascaded server 12D has physical interfaces P-B1 and P-B2 with links to standby server 12B and active server 12A, respectively, all configured with bridge domain V14. Consequently, forwarding planes 202C, 202D switch traffic at Layer 2 with DU server 12A that is active in FIG. 5A and not with DU server 12B that is standby in FIG. 5B. Servers 12A, 12B each have a bonded interface "bond0" having three interfaces, two interfaces with links to one another, and a third interface to TOR switch 26 and configured with bridge domain V14. Consequently, forwarding plane 202A switch traffic at Layer 2 between TOR switch 26 and server 12B when DU server 12A is active, as in FIG. 5A.

FIG. 5B illustrates the configuration of cell site 15A on failover. Optical switch 27 is off, which activates the optical link between DU server 12B and TOR switch 26, causing DU server 12B to be set to active and DU server 12A to be set to standby. This also causes the bonded interfaces of forwarding planes 202C, 202D to swap the active/standby links, resulting in L2 switching by forwarding planes 202C, 202D with now-active server 12B. By using bonded interfaces, forwarding plane 202 can avoid loops without having to rely on Spanning Tree Protocol.

Although shown with respect to bridge domain V14, the links may also or alternatively be configured with any of bridge domains V11-V13, or a separate management domain, to facilitate failover of, e.g., user and control plane traffic between DU servers 12A and 12B.

Figure 6:
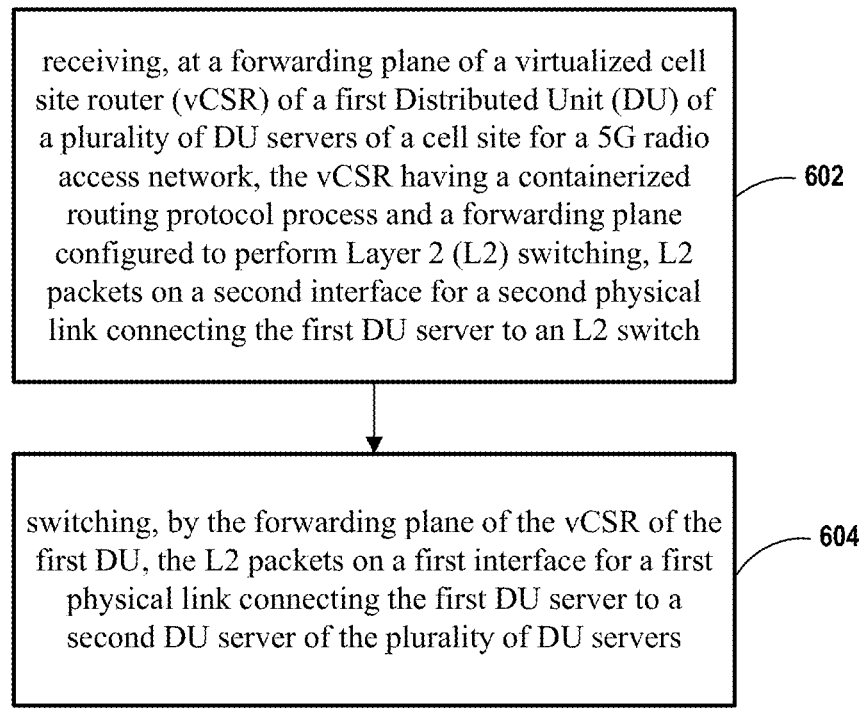
FIG. 6 is flowchart illustrating an example mode of operation for a virtualized cell site router of a Distributed Unit server, according to one or more aspects of this disclosure.

FIG. 6 is flowchart illustrating an example mode of operation for a vCSR of a DU server, according to one or more aspects of this disclosure. The operation is described with respect to cell site 15, and more particularly, DU server 12A. DU server 12A includes vCSR 20A having cRPD 24A (a containerized routing protocol process) and forwarding plane 202A. Forwarding plane 202A is configured with a first interface for a first physical link connecting DU server 12A to server 12C and a second interface for a second physical link connecting DU server 12A to TOR switch 26. Forwarding plane 202A receives L2 packets on the second interface for the second physical link (602). Forwarding plane 202A switches the L2 packets on the first interface for the first physical link to the DU server 12C (604). In this way, vCSRs 20 of DU servers 12 may implement a "pure" L2 network for the network of DU servers 12A-12D, despite DU servers 12A-12D not being connected to a common physical L2 switch. The L2 network implemented in part by forwarding planes 202A-202D may be used to L2 forwarding DHCP messages, which may be L2 messages exchanged by RUs 14 with DHCP server 19 via DHCP-relay by PE router 21, in order to assign IP addresses to RUs 14 from the centrally-managed DHCP server 19.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system comprising:
   a plurality of Distributed Unit (DU) servers each comprising a virtualized cell site router (vCSR) having a forwarding plane configured to perform Layer 2 (L2) switching,
   wherein a first DU server of the plurality of DU servers is connected by a first physical link with a second DU server of the plurality of DU servers and is connected by a second physical link with an L2 switch, and
   wherein the forwarding plane of the vCSR of the first DU server is configured to switch an L2 packet between the first physical link with the second DU server and the second physical link with the L2 switch.

2. The computing system of claim 1,
   wherein the computing system is deployed to a cell site for a radio access network, and
   wherein the L2 switch is located at a group center or edge data center and has a physical link to a DU server located in another cell site for the radio access network.

3. The computing system of claim 1, further comprising:
   an optical switch, wherein the second physical link comprises optical links between the first DU server and the optical switch and between the optical switch and the L2 switch;
   wherein a third DU server of the plurality of DU servers is connected by a third physical link to the second DU server and is connected by a fourth physical link to the L2 switch,
   wherein the fourth physical link comprises optical links between the third DU server and the optical switch and between the optical switch and the L2 switch, and
   wherein, based on a failover event, the optical switch is configured to switch from the second physical link to the fourth physical link to cause the third DU server to operate as an active DU server for a cell site for a radio access network and the first DU server to operate as a standby DU server for the cell site.

4. The computing system of claim 3, wherein the forwarding plane of the vCSR of the second DU server is configured to, based on the third DU server operating as the active DU server for the cell site, switch packets to the third DU server.

5. The computing system of claim 1, wherein the second DU server is not connected by a physical link to the L2 switch.

6. The computing system of claim 1,
   wherein the first DU server is operating as an active DU server for a cell site for a radio access network,
   wherein the second DU server is connected by a third physical link to a third DU server, of the plurality of DU servers, that is operating as a standby DU server for the cell site, and
   wherein the forwarding plane of the vCSR of the second DU server comprises a bonded interface including respective interfaces for the first physical link and the third physical link such that, upon failover to the third DU server to operate as the active DU server for the cell site, the forwarding plane of the vCSR of the second DU server is configured to switch, at Layer 2, traffic to the third DU server via the interface for the third physical link.

7. The computing system of claim 1,
   wherein each of the plurality of DU servers comprises a DU for a radio access network, and
   wherein the L2 packet comprises at least one of mobile data traffic or mobile control traffic between the DU of the second DU server and a centralized unit (CU) for the radio access network.

8. The computing system of claim 1,
   wherein the L2 packet comprises a Dynamic Host Configuration Protocol (DHCP) Discover message generated by a Radio Unit (RU) for a radio access network and connected to the second DU server, and
   wherein the forwarding plane of the vCSR of the first DU server is configured to switch the DHCP Discover message on the second physical link toward the L2 switch.

9. The computing system of claim 8,
   wherein the forwarding plane of the vCSR of the first DU server is configured to switch, at Layer 2, on the first physical link to the first DU server, a received DHCP Offer message responsive to the DHCP Discover message, wherein the DHCP Offer message includes an Internet Protocol (IP) address for the RU.

10. A method comprising:
    receiving, at a forwarding plane of a virtualized cell site router (vCSR) of a first Distributed Unit (DU) server of a plurality of DU servers, the forwarding plane of the vCSR of the first DU server being configured to perform Layer 2 (L2) switching, an L2 packet via a second physical link connecting the first DU server to an L2 switch; and
    switching, by the forwarding plane of the vCSR of the first DU server, the L2 packet on a first physical link connecting the first DU server with a second DU server of the plurality of DU servers.

11. The method of claim 10, wherein the plurality of DU servers are deployed to a cell site for a radio access network.

12. The method of claim 11, wherein the L2 switch is located at a group center or edge data center and has a physical link to a DU server located in another cell site for the radio access network.

13. The method of claim 10,
wherein the second physical link comprises optical links between the first DU server and an optical switch and between the optical switch and the L2 switch,
wherein a third DU server of the plurality of DU servers is connected by a third physical link to the second DU server and is connected by a fourth physical link to the L2 switch,
wherein the fourth physical link comprises optical links between the third DU server and the optical switch and between the optical switch and the L2 switch, the method further comprising:
switching, by the optical switch, based on a failover event, from the second physical link to the fourth physical link to cause the third DU server to operate as an active DU server for a cell site for a radio access network and the first DU server to operate as a standby DU server for the cell site.

14. The method of claim 13, further comprising:
switching, by the forwarding plane of a vCSR of the second DU server, based on the third DU server operating as the active DU server for the cell site, packets to the third DU server.

15. The method of claim 10,
wherein the first DU server is operating as an active DU server for a cell site for a radio access network,
wherein the second DU server is connected by a third physical link to a third DU server, of the plurality of DU servers, that is operating as a standby DU server for the cell site, and
wherein the forwarding plane of a vCSR of the second DU server comprises a bonded interface including respective interfaces for the first physical link and the third physical link, the method further comprising:
switching, by the forwarding plane of the vCSR of the second DU server, upon failover to the third DU server to operate as the active DU server for the cell site, at Layer 2, traffic to the third DU server via the interface for the third physical link.

16. The method of claim 10,
wherein each of the plurality of DU servers comprises a DU for a radio access network, and
wherein the L2 packet comprises at least one of mobile data traffic or mobile control traffic between the DU of the second DU server and a centralized unit (CU) for the radio access network.

17. The method of claim 10,
wherein the L2 packet comprises a Dynamic Host Configuration Protocol (DHCP) Discover message generated by a Radio Unit (RU) for a radio access network and connected to the second DU server, and
wherein the forwarding plane of the vCSR of the first DU server is configured to switch the DHCP Discover message on the second physical link toward the L2 switch.

18. The method of claim 17,
wherein the forwarding plane of the vCSR of the first DU server is configured to switch, at Layer 2, on the first physical link to the first DU server, a received DHCP Offer message responsive to the DHCP Discover message, wherein the DHCP Offer message includes an Internet Protocol (IP) address for the RU.

19. Non-transitory computer readable media comprising instructions that, when executed by processing circuitry, cause the processing circuitry to:
receive, at a forwarding plane of a virtualized cell site router (vCSR) of a first Distributed Unit (DU) server of a plurality of DU servers, the forwarding plane of the vCSR of the first DU server being configured to perform Layer 2 (L2) switching, an L2 packet via a second physical link connecting the first DU server to an L2 switch; and
switch, by the forwarding plane of the vCSR of the first DU server, the L2 packet on a first physical link connecting the first DU server with a second DU server of the plurality of DU servers.

20. Non-transitory computer readable media comprising instructions that, when executed by processing circuitry, cause the processing circuitry to:
receive, at a forwarding plane of a virtualized cell site router (vCSR) of a first Distributed Unit (DU) server of a plurality of DU servers of a cell site for a 5G radio access network, the vCSR of the first DU server having a containerized routing protocol process and a forwarding plane configured to perform Layer 2 (L2) switching, an L2 packet on a second interface for a second physical link connecting the first DU server to an L2 switch; and
switch, by the forwarding plane of the vCSR of the first DU server, the L2 packet on a first interface for a first physical link connecting the first DU server to a second DU server of the plurality of DU servers.

* * * * *